United States Patent [19]

Yamamoto

[11] Patent Number: 5,169,293
[45] Date of Patent: Dec. 8, 1992

[54] EJECTOR WITH HIGH VACUUM FORCE IN A VACUUM CHAMBER

[75] Inventor: Tatsuro Yamamoto, Aichi, Japan

[73] Assignee: Inax Corporation, Tokoname, Japan

[21] Appl. No.: 712,950

[22] Filed: Jun. 10, 1991

[30] Foreign Application Priority Data

Jun. 18, 1990 [JP] Japan ................................ 2-159464

[51] Int. Cl.$^5$ ............................................. F04F 5/04
[52] U.S. Cl. ..................................... 417/179; 210/758; 261/DIG. 75
[58] Field of Search ................. 417/84, 174, 179, 151; 261/DIG. 75; 366/168, 177; 210/758

[56] References Cited

U.S. PATENT DOCUMENTS

| | | | |
|---|---|---|---|
| 945,177 | 1/1910 | Szamek | 366/177 |
| 1,526,179 | 2/1925 | Parr et al. | 417/174 |
| 2,852,922 | 9/1958 | Neumann et al. | 417/174 |
| 3,655,343 | 4/1972 | Galeano | 210/758 |
| 4,828,768 | 5/1989 | Talmor | 261/DIG. 75 |

FOREIGN PATENT DOCUMENTS 1377571  9/1964  France ........................ 261/DIG. 75

Primary Examiner—Leonard E. Smith
Attorney, Agent, or Firm—Kanesaka and Takeuchi

[57] ABSTRACT

An ejector includes a nozzle through which a first fluid is ejected to produce a vaccum in a vacuum chamber. The vacuum chamber includes an opening through which a second fluid is introduced. The vacuum chamber further includes an inlet through which a third fluid is introduced thereinto.

3 Claims, 5 Drawing Sheets

EJECTOR WITH HIGH VACUUM FORCE IN A VACUUM CHAMBER

FIELD OF THE INVENTION AND RELATED ART STATEMENT

The present invention relates to ejectors and in particular, to an ejector suitable for use in a water purification system.

An ejector typically includes a nozzle from which a fluid is ejected at a high speed to create a vacuum in a vacuum chamber adjacent to the nozzle. This causes another fluid to enter into the vacuum chamber through an opening. These fluids are then discharged from the vacuum chamber. Such an ejector is widely used to substitutee fr a vacuum pump or to provide a mixture of air and liquid. FIG. 7 shows one example of an ejector well known in the art. As illustrated, the ejector includes a submergible or underwater pump 100 to feed water to a nozzle 102. The water is then ejected at a high speed to produce a vacuum in a vacuum chamber 106. This causes air to enter into the vacuum chamber through an inlet pipe 108. A jet of water together with the air is discharged through a discharge pipe 104.

A disadvantage with the prior art ejector is that air can not sufficiently be introduced through the inlet pipe. Additionally, air and water can not be mixed to a full extent. Thus, a sufficient amount of air (oxygen) can not be added to (or resolved into) water.

OBJECT AND SUMMARY OF THE INVENTION

It is an object of the present invention to provide an ejector which provides a high degree of vacuum in a vacuum chamber.

Another object of the present invention is to provide an ejector which fully forces air to enter into water.

According to the present invention, there is provided an ejector including a nozzle from which a first fluid is ejected to create a vacuum in a vacuum chamber, the vacuum chamber being defined adjacent to the nozzle and including an opening through which a second fluid is introduced, wherein the vacuum chamber includes an inlet through which a third fluid is supplied thereto.

Preferably, the inlet is formed upstream of the front end of the nozzle.

The ejector of the present invention may be arranged in a purification tank to effect aerobic treatment or anaerobic treatment so as to purify a liquid in the tank.

The ejector of the present invention may also be placed in an aeration tank. Water is ejected into the tank by the ejector, and air is introduced through the opening. The air is then discharged together with a jet of water. Raw water is fed from a raw water tank, located upstream of the vacuum chamber, or sludge is supplied from a sedimentation tank, located downstream of the vacuum chamber, to the vacuum chamber through the inlets.

According to a first embodiment of the present invention, the vacuum chamber in the ejector includes inlets through which a third fluid is introduced into the vacuum chamber.

Generally, a fluid is introduced through the opening into the vacuum chamber under vacuum and then, discharged together with a jet of water from a nozzle (The ejector performs the same function when used to mix liquid and air or when used in place of a vacuum pump). If an inlet is formed in the vacuum chamber to introduce a third fluid (The third fluid is typically the same as the first fluid, but may be different from the first fluid), a degree of vacuum in the vacuum chamber would be reduced. This may result in a decrease in the amount of air to be introduced into the vacuum chamber. Such an inlet is assumed to deteriorate the effectiveness of the ejector.

However, experiments, carried out by the inventor of the present invention, have shown that such an inlet increases the degree of vacuum in the vacuum chamber and thus, promotes introduction of the second fluid into the vacuum chamber or more effectively mixes the first fluid (normally, liquid) and the second fluid (normally, gas) together. It is found that KLa (overall coefficient of oxygen movement capacity) as an index to show how easily oxygen is added to a liquid can be increased by ejecting water from the ejector and mixing and discharging the water and air together. This is probably because turbulence is created in the vacuum chamber as the second fluid is forced or sucked into the vacuum chamber while a predetermined amount of third fluid is introduced through the inlet. This turbulence produces a higher degree of vacuum so as to introduce a greater amount of second fluid into the vacuum chamber. Also, the air and the fluid are well stirred or mixed under the influence of turbulence.

According to a second embodiment of the present invention, the inlet is located upstream of the front end of the nozzle.

By this arrangement, the third fluid is forced against the nozzle to promote turbulence. This results in an increase in the degree of vacuum. The fluid is thus stirred or mixed well together. It is found that the amount of the third fluid introduced through the inlet is preferably one third to fifth of the amount of the second fluid introduced through the opening.

According to a third embodiment of the present invention, the ejector is used with a purification system and serves as an aerator or agitator. The ejector as an aerator can effectively purify fluid in a tank.

The ejector may also serve as an agitator to effect anaerobic treatment of fluid in a tank.

In the case of anaerobic treatment, the opening can be kept closed during operation of the ejector as an agitator.

However, with a conventional ejector, an excessive degree of vacuum is produced in a vacuum chamber if the opening is closed. This restricts flow of fluid from a nozzle. As a result, the fluid can not smoothly flow out of the nozzle or the fluid can not be stirred well in the tank.

With the ejector of the present invention, the third fluid flows into the vacuum chamber through the inlet so as to facilitate discharge of a jet of water and promote mixing of the fluid in the tank. The ejector of the present invention is advantageous particularly when it is used in a single tank to repreatedly effect aerobic and anaerobic treatments.

According to a fourth embodiment of the present invention, the ejector serves as an aerator in an aeration tank. Raw water is fed from a raw water tank, located upstream of the aeration tank, to the vacuum chamber and/or sludge is supplied from a sedimentation tank, located downstream of the aeration tank, to the vacuum chamber through the inlet.

In such a system, the ejector effectively purifies water in the tank by high KLa value. The raw water or the sludge, as introduced into the vacuum chamber through the inlet, is well mixed with the fluid in the tank to provide a jet of water. In this way, the fluid in the tank can effectively be purified.

Advantageously, this arrangement eliminates the need for pumps to feed raw water into the aeration tank and to return sludge from the sedimentation tank to the aeration tank.

DESCRIPTION OF PREFERRED EMBODIMENTS

The present invention will now be described in detail with reference to the accompanying drawings wherein an ejector is designed to provide a mixture of air and fluid.

Figure 1:
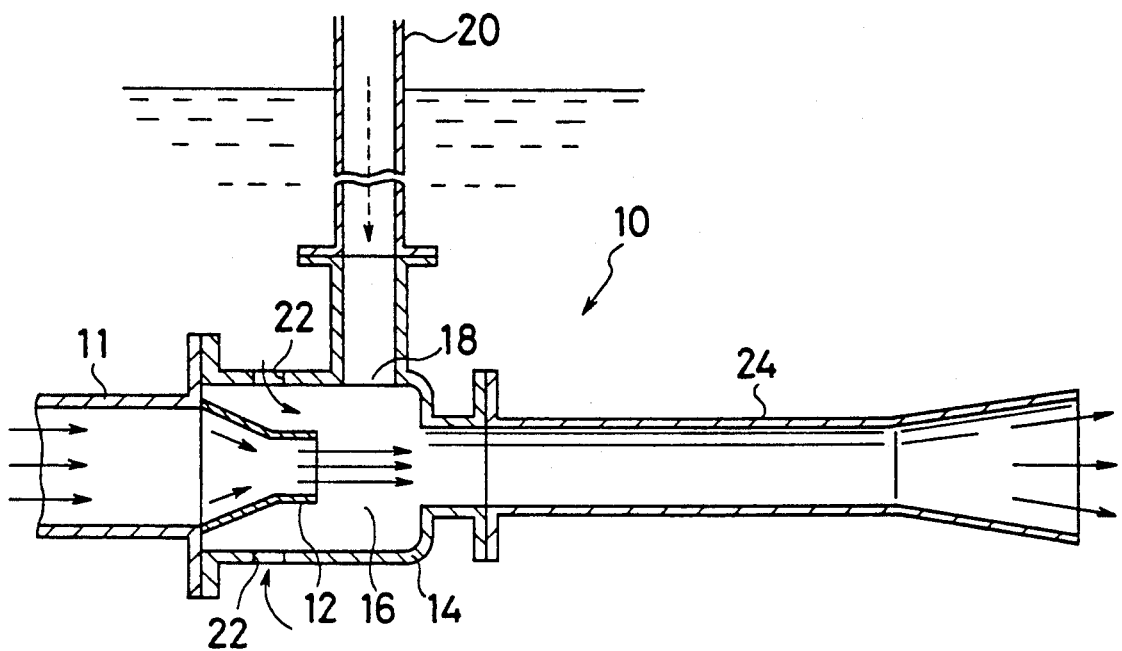
FIG. 1 is a sectional view showing a principal part of an ejector according to one embodiment of the present invention.

Referring to FIG. 1, there is shown an ejector 10. 11 is a pipe communicated with a pump. A nozzle 12 is connected to one end of the pipe 11 and has an open end through which a first fluid is introduced, and the other open end through which the first fluid is discharged. A casing 14 surrounds the nozzle 12 and defines a vacuum chamber 16. The casing 14 has an opening 18. An inlet pipe 20 extends from the opening 18 to introduce air into the vacuum chamber 16. The upper end of the inlet pipe 20 extends above the level of water.

The casing 14 also includes water inlets 22 (In the illustrated embodiment, the casing has two water inlets, but may have a single water inlet). Water in a tank can flow into the vacuum chamber 16 through the water inlets 22. The diameter of each water inlet 22 is selected such that an amount of water into the vacuum chamber 16 therethrough is approximately one third to fifth of that of air flowing through the inlet pipe 20 and the opening 18 into the vacuum chamber 16.

Illustratively, the water inlets 22 are formed leftwardly or upstream of the front end of the nozzle 12, but may be located at any other places.

24 is an outlet pipe through which a mixture of air and water is discharged.

Operation of the ejector will next be described.

With the ejector 10 of this embodiment, water is fed from a pump to a water tank. The water is then ejected at a high speed through the nozzle 12. This causes air to flow out of the vaccum chamber 16 to reduce pressure in the vacuum chamber below atmospheric pressure. Air is then sucked into the vacuum chamber 16 via the inlet pipe 20 and the opening 18. The air thus sucked is thereafter discharged from the vacuum chamber 16 through the outlet pipe 24.

In the meantime, water flows from the tank into the vacuum chamber 16. An amount of water introduced through the inlets 22 into the vacuum chamber 16 is approximately one third to fifth of an amount of air introduced into the vaccum chamber 16 through the opening 18. When a predetermined amount of water is introduced into the vacuum chamber 16 through the water inlets 22, turbulence is created in the vacuum chamber 16 due to a jet of water through the nozzle 12 and a high speed flow of air through the opening 18. This provides a higher degree of vacuum in the vacuum chamber 16 so as to promote introduction of air into the vacuum chamber 16 through the inlet pipe 20 and the opening 18. The water and air are thus sufficiently mixed through the vacuum chamber 16 and the outlet pipe 24.

Figure 2:
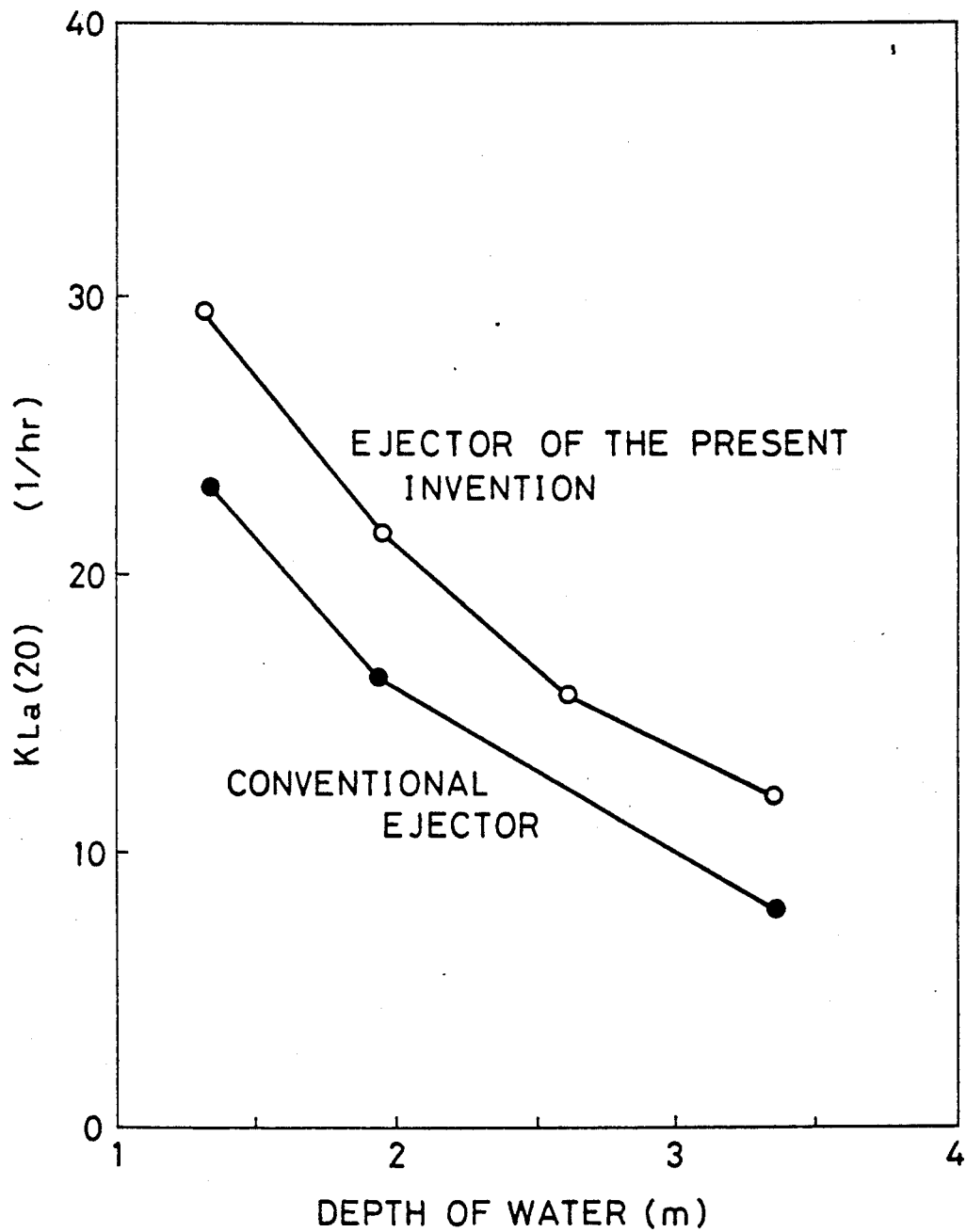
FIG. 2 is a graph showing advantage of the ejector shown in FIG. 1.

In the ejector 10 of this embodiment, the water inlets 22 are located upstream of the front end of the nozzle 12. With this arrangement, water comes into contact with the nozzle 12 after it flows in through the water inlets 22. This applies more turbulence to a mixture of air and water. FIG. 2 shows KLa (overall coefficient of oxygen movement capacity) obtained by the ejector 10 of the present invention in comparison with that obtained by a conventional ejector with no water inlets.

As illustrated, the ejector 10 provides substantially greater KLa than that obtained by the prior art ejector.

Figure 3:
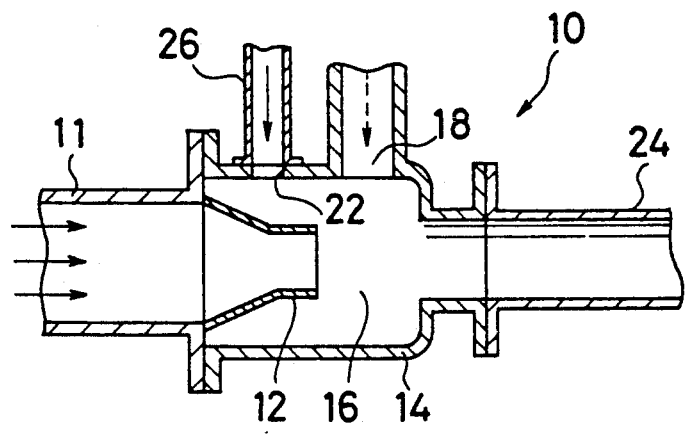
FIG. 3 is a sectional view showing the principal part of an ejector according to another embodiment of the present invention.

As stated earlier, the number of water inlets 22 may be one rather than two in the illustrated embodiment (FIG. 3). In addition, a couduit 26 may be connected to the water inlet 22 to feed a desired liquid by means of a pump or other means.

Figure 4:
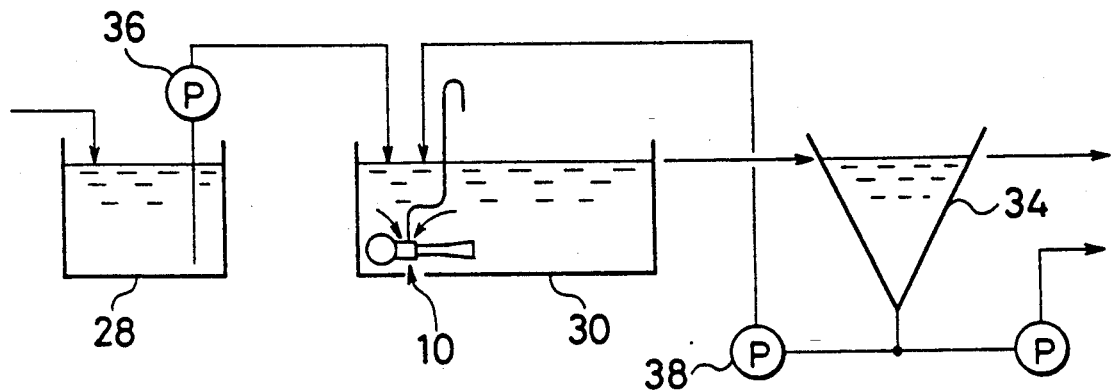
FIG. 4 is a schematic view of a water purification system according to one embodiment of the present invention.

FIG. 4 shows one example of a water purification system with the use of the ejector 10 as described above. In FIG. 4, 28 is a flow control tank (raw water tank). 30 is an aeration tank. 34 is a sedimentation tank. With this system, water is fed from the flow control tank 28 to the aeration tank 30 by a pump 36. Some of sludge as return sludge is returned from the sedimentation tank 34 to the aeration tank 30 by a pump 38. Raw water and return sludge are then mixed with air by the ejector 10 in the aeration tank 30. That is, aeration is effected to purify the raw water.

Figure 8:
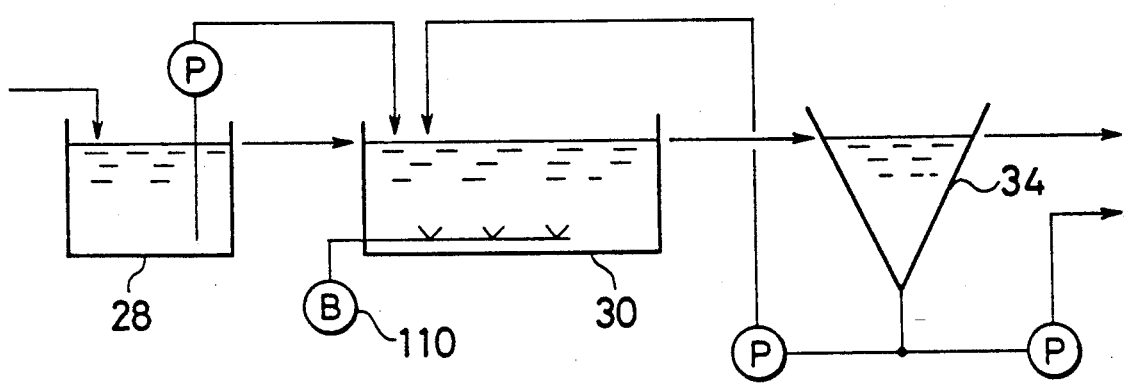
FIGS. 8 and 9 are schematic views of conventional water purification systems.
Figure 9:
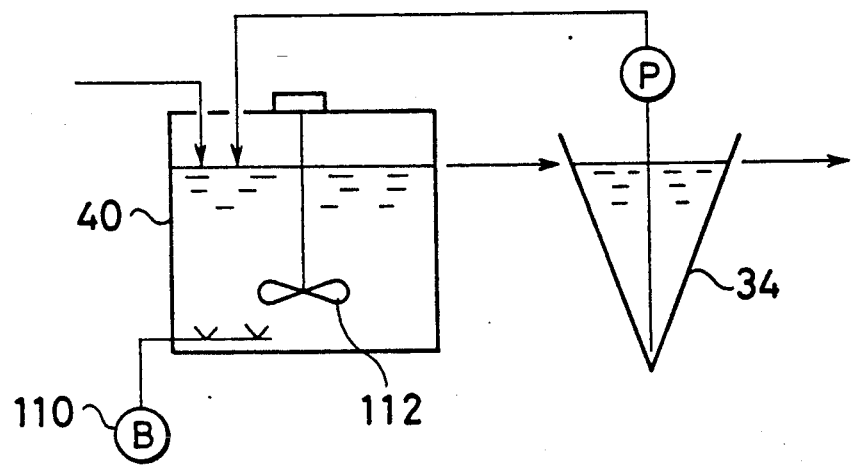

Conventionally, a blower 110 is mounted to the aeration tank 30 to effect aeration as shown in FIGS. 8 and 9.

According to the invention, the water purification system uses the ejector 10 in place of the blower 110 so as to more effectively perform aeration and thus, purify sewage.

Figure 5:
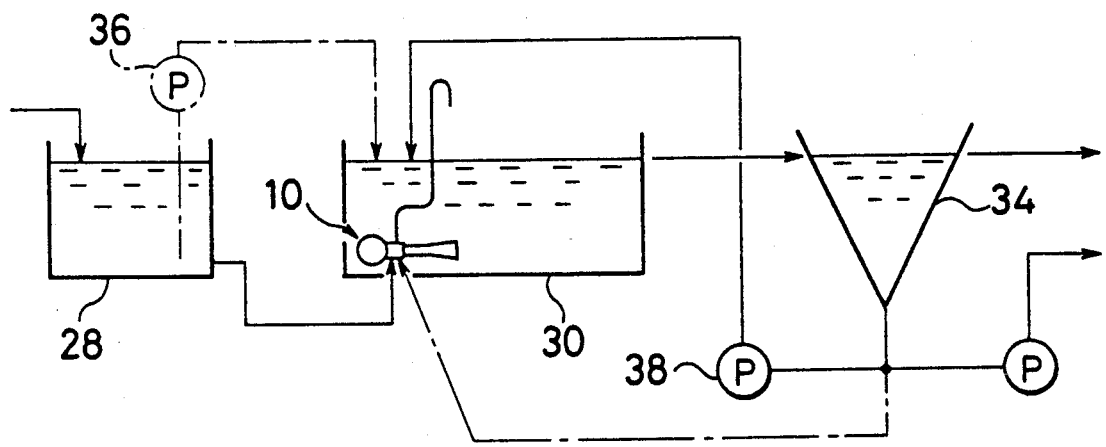
FIGS. 5 and 6 are schematic veiws of purification systems according to different embodiments of the present invention.

FIG. 5 shows a water purification system according to another embodiment of the present invention. In this example, raw water flows from the flow control tank 28 through the water inlets 22 of the ejector 10 into the vacuum chamber 16.

This arrangement not only eliminates the need for a pump 36 to feed raw water, but also more effectively mix raw water with air and a liquid contained in the aeration tank 30. This results in an improvement in purification of the raw water.

Sludge may be supplied from the sedimentation tank 34 through the water inlets 22 into the vacuum chamber 16, instead of or in addition to introducing the raw water through the water inlets 22. The sludge is then discharged from the aeration tank 30 together with the liquid and air in the aeration tank 30. This arrangement eliminates the need for a pump 38 to return sludge. Also, sludge can be more effectively mixed with air and the liquid contained in the aeration tank 30 so as to improve purification.

Figure 6:
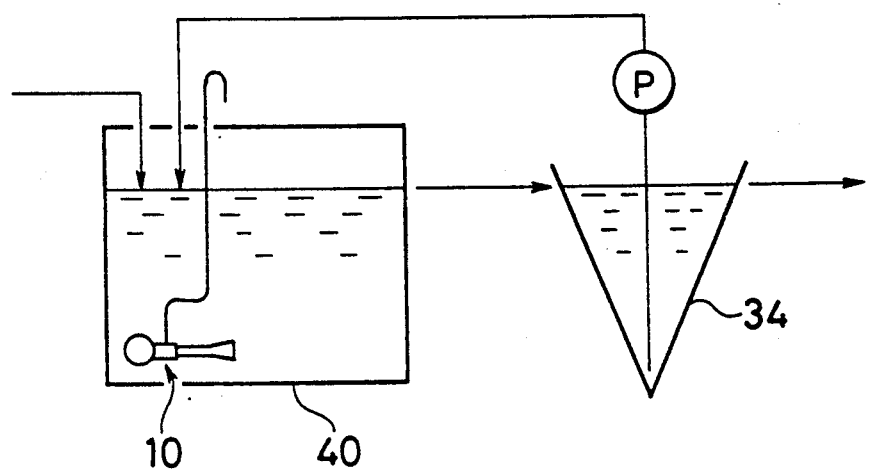
Figure 7:
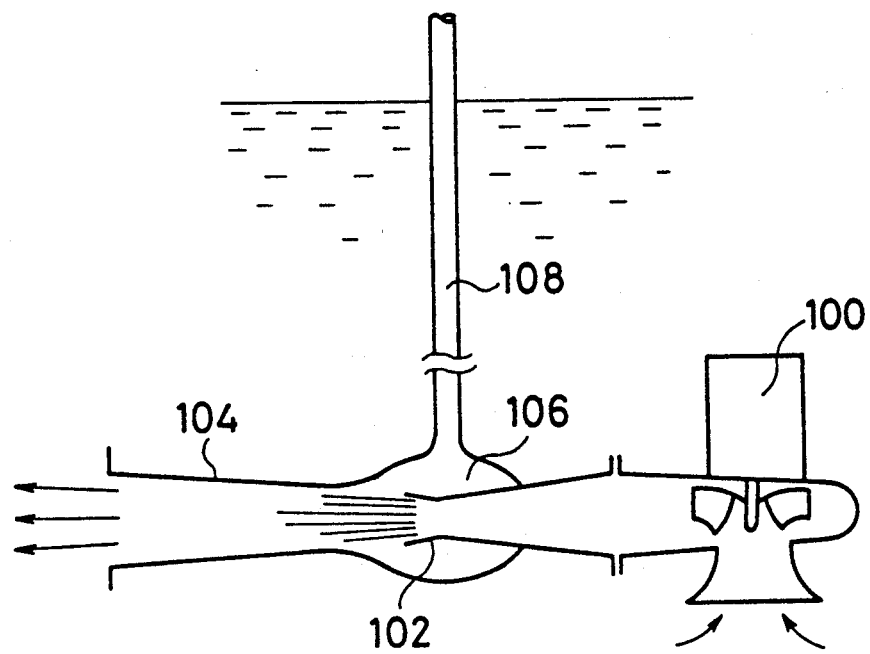
FIG. 7 is a schematic view of a conventional ejector.

FIG. 6 shows a system according to a further embodiment of the present invention. This system includes a treatment tank 40 to repeatedly effect an aerobic treatment an anaerobic treatment so as to exclude nitrogen. The ejector 10 is arranged in the treatment tank 40.

Conventionally, an agitator 112 is provided in the tank 40 as shown in FIG. 9. Also, a blower 110 is used to force air through water in the tank 40. In the case of anaerobic treatment, an agitator 112 is rendered operative, while the blower is stopped. In the case of aerobic treatment, only the blower 110 is operated. According to the invention, the system utilizes the ejector 10 in place of the blower 110 and the agitator 112.

When anaerobic treatment is performed with the use of the ejector 10, the ejector is operated while a valve in the inlet pipe 20 is kept closed. If the inlet pipe is closed in a conventional ejector, the vacuum chamber provides an excessively higher degree of vacuum. This restricts discharge of water through the outlet pipe 24. In fact, it is difficult for a conventional ejector to perform anaerobic treatment.

According to the present invention, the liquid flows from the tank 40 through the inlets 22 into the vacuum chamber 16 even if the inlet pipe 20 is closed. Thus, the liquid can smoothly be discharged through the outlet pipe 24, and effective agitation takes place within the tank 40 to fully effect anaerobic treatment.

Although the preferred embodiments of the present invention have been described in detail, various changes may be made in the invention.

The ejector of the present invention may be used for various purposes. For example, the ejector can be used to produce vacuum or add gas to a liquid.

I claim:

1. An ejector adapted to mix a first fluid in a form of liquid, a second fluid in a form of gas and a third fluid in a form of liquid together, comprising:
   a nozzle having an outer periphery, an open rear end for introducing the first fluid in the form of liquid thereinto and an open front end for discharging the first fluid therethrough;
   a casing disposed outside the nozzle to surround the outer periphery of the nozzle to form a vacuum chamber between the casing and the outer periphery of the nozzle, said casing having a side wall and an outlet at a portion facing the open front end of the nozzle;
   an outlet pipe connected to the outlet of the casing to allow the first to third fluids to flow therethrough, said first fluid producing vacuum in the vacuum chamber;
   an opening formed in the side wall of the casing for introducing the second fluid in the form of gas into the vacuum chamber, said opening being located at a side between the open front end of the nozzle and the outlet of the casing; and
   an inlet formed in the side wall of said casing for introducing the third fluid in the form of liquid into the vacuum chamber, said inlet having a size such that one third to one fifth of the third fluid is introduced into the vacuum chamber relative to an amount of the second fluid introduced into the vacuum chamber through the opening, said inlet being located adjacent to the opening at a side of the nozzle away from the outlet of the casing so that when the first fluid is introduced into the vacuum chamber through the nozzle, vacuum force in the vacuum chamber is increased to create turbulence flow therein and to thoroughly mix the first, second and third fluids therein without decreasing vacuum force in the vacuum chamber.

2. An ejector according to claim 1, wherein the first and third liquids are water, and the second gas is air.

3. An ejector for a water purification system including an aeration tank and a sedimentation tank, said ejector being located in the aeration tank and adapted to mix first, second and third fluids together, at least one of the first and third fluids having a form of liquid filled in the aeration tank and the second fluid having a form of air, comprising:
   a nozzle having an outer periphery, an open rear end for introducing the first fluid in a form of liquid thereinto and an open front end for discharging the first fluid therethrough;
   a casing disposed outside the nozzle to surround the outer periphery of the nozzle to form a vacuum chamber between the casing and the outer periphery of the nozzle, said casing having a side wall and an outlet at a portion facing the open front end of the nozzle;
   an outlet pipe connected to the outlet of the casing to allow the first to third fluids to flow therethrough, said first fluid producing vacuum in the vacuum chamber;
   an opening formed in the side wall of the casing for introducing the second fluid in the form of air into the vacuum chamber, said opening being located at a side between the open front end of the nozzle and the outlet of the casing; and
   an inlet formed in the side wall of said casing for introducing the third fluid in a form of liquid into the vacuum chamber, said inlet having a size such that one third to one fifth of the third fluid is introduced into the vacuum chamber relative to an amount of the second fluid introduced into the vacuum chamber through the opening, said inlet being located adjacent to the opening at a side of the nozzle away from the outlet of the casing so that when the first fluid is introduced into the vacuum chamber through the nozzle, vacuum force in the vacuum chamber is increased to create turbulence flow therein and to thoroughly mix the first, second and third fluids therein without decreasing vacuum force in the vacuum chamber.

* * * * *